(12) United States Patent
Syrgabekov et al.

(10) Patent No.: US 9,164,827 B2
(45) Date of Patent: Oct. 20, 2015

(54) PARITY BASED METHOD FOR RECONSTRUCTING A DATA SUBSET WHEREIN SAID SUBSET BELONGS TO MULTIPLE PARITY SETS

(75) Inventors: Iskender Syrgabekov, London (GB); Yerkin Zadauly, Almaty (KZ)

(73) Assignee: Qando Services Inc., Road Town, Tortola (VG)

( * ) Notice: Subject to any disclaimer, the term of this patent is extended or adjusted under 35 U.S.C. 154(b) by 0 days.

(21) Appl. No.: 14/131,862

(22) PCT Filed: Jul. 17, 2012

(86) PCT No.: PCT/EP2012/064030
§ 371 (c)(1),
(2), (4) Date: Sep. 10, 2014

(87) PCT Pub. No.: WO2013/011037
PCT Pub. Date: Jan. 24, 2013

(65) Prior Publication Data
US 2015/0006956 A1  Jan. 1, 2015

(30) Foreign Application Priority Data
Jul. 18, 2011 (GB) .................................. 1112333.8

(51) Int. Cl.
*G06F 11/00* (2006.01)
*G06F 11/10* (2006.01)

(52) U.S. Cl.
CPC ............ *G06F 11/10* (2013.01); *G06F 11/1088* (2013.01); *G06F 11/1092* (2013.01); *G06F 2211/1059* (2013.01)

(58) Field of Classification Search
CPC ............ G06F 11/1076; G06F 11/1084; G06F 11/1092; G06F 11/10; G06F 11/108; G06F 11/1088; G06F 2211/1011; G06F 2211/1023; G06F 2211/1026; G06F 2211/1028
USPC ........................................................ 714/6.24
See application file for complete search history.

(56) References Cited

U.S. PATENT DOCUMENTS 6,453,440 B1    9/2002  Cypher
7,496,785 B2 *  2/2009  Elliot et al. .................... 714/6.2
(Continued)

FOREIGN PATENT DOCUMENTS

EP    0569236 A2    11/1993
EP    1016967 A2    7/2000
(Continued)

OTHER PUBLICATIONS

GB Second Examination Report dated Oct. 10, 2013 for GB1112333.8.
(Continued)

*Primary Examiner* — Marc Duncan
(74) *Attorney, Agent, or Firm* — Banner & Witcoff, Ltd.

(57) ABSTRACT

Method and apparatus for protecting data comprising dividing data into a plurality of data subsets. Generating parity data for each data subset and another data subset of the plurality of data subsets. Generating parity data for each data subset and a second other data subset of the plurality of data subsets. Method and apparatus for recovering data comprising retrieving one or more data subsets. Retrieving two or more different parity data sets generated for one data subset. Regenerating any missing data subsets using the retrieved one or more data subset and two or more retrieved parity data sets. Combining the one or more retrieved data subset and regenerated missing data subsets to form the recovered data.

13 Claims, 2 Drawing Sheets

(56) References Cited

U.S. PATENT DOCUMENTS

| | | | |
|---|---|---|---|
| 7,917,831 B2* | 3/2011 | Millman et al. | 714/763 |
| 7,945,729 B2* | 5/2011 | Hafner | 711/114 |
| 8,250,433 B2* | 8/2012 | Wylie et al. | 714/758 |
| 8,335,966 B1* | 12/2012 | Lary et al. | 714/770 |
| 8,510,370 B2* | 8/2013 | Quinn et al. | 709/203 |
| 8,972,692 B2* | 3/2015 | Leggette et al. | 711/170 |
| 9,047,218 B2* | 6/2015 | Resch et al. | 1/1 |
| 2002/0048284 A1* | 4/2002 | Moulton et al. | 370/500 |
| 2003/0126522 A1* | 7/2003 | English et al. | 714/718 |
| 2003/0126523 A1* | 7/2003 | Corbett et al. | 714/718 |
| 2005/0216787 A1* | 9/2005 | Subbarao et al. | 714/5 |
| 2006/0047896 A1* | 3/2006 | Nguyen et al. | 711/112 |
| 2006/0248378 A1* | 11/2006 | Grcanac et al. | 714/6 |
| 2007/0174363 A1* | 7/2007 | Courtney | 707/204 |
| 2010/0106906 A1* | 4/2010 | Galloway et al. | 711/114 |
| 2011/0213928 A1* | 9/2011 | Grube et al. | 711/114 |
| 2012/0047339 A1* | 2/2012 | Decasper et al. | 711/162 |
| 2012/0059990 A1* | 3/2012 | Iida | 711/114 |
| 2012/0124286 A1* | 5/2012 | Galloway et al. | 711/114 |
| 2012/0272000 A1* | 10/2012 | Shalvi | 711/114 |
| 2012/0311255 A1* | 12/2012 | Chambliss et al. | 711/114 |
| 2012/0324284 A1* | 12/2012 | Corbett et al. | 714/20 |
| 2014/0317447 A1* | 10/2014 | Colgrove et al. | 714/6.24 |
| 2014/0359349 A1* | 12/2014 | Grube et al. | 714/6.22 |

FOREIGN PATENT DOCUMENTS

| | | |
|---|---|---|
| GB | 2463085 A | 3/2010 |
| JP | 2000-207136 A | 7/2000 |
| JP | 2004-034278 A | 2/2004 |
| JP | 2004-348278 A | 12/2004 |
| JP | 2004-348281 A | 12/2004 |
| JP | 2006-003971 A | 1/2006 |
| WO | 2009039336 A2 | 3/2009 |

OTHER PUBLICATIONS

GB First Examination Report dated Jun. 25, 2013 for GB1112333.8.
International Search Report dated Oct. 29, 2012 for PCT/EP2012/064030.
GB Search Report dated Aug. 19, 2011 for GB1112333.8.
Distributed RAID—A New Multiple Copy Algorithm. Michael Stonebraker, Gerhard A. Scholoss: Distributed RAID—A New Multiple Copy Algorithm. ICDE 1990: 430-437).

* cited by examiner

PARITY BASED METHOD FOR RECONSTRUCTING A DATA SUBSET WHEREIN SAID SUBSET BELONGS TO MULTIPLE PARITY SETS

CROSS REFERENCE TO RELATED APPLICATIONS

This application claims priority to PCT application PCT/EP2012/064030, filed Jul. 17, 2012, entitled PARITY BASED METHOD FOR RECONSTRUCTING A DATA SUBSET WHEREIN SAID SUBSET BELONGS TO MULTIPLE PARITY SETS, which claims priority to United Kingdom application no. 1112333.8, filed Jul. 18, 2011.

FIELD OF THE INVENTION

The present invention relates to a method and apparatus for generating parity data and in particular for use in error correction and data reconstruction.

BACKGROUND OF THE INVENTION

Parity data is used to achieve redundancy when storing or transmitting data. Parity data may be used to check that read or received data is correct or to regenerate any missing data, for example, when a disc drive or communication channel fails. Typically, parity data is generated using the exclusive or (XOR) logical function applied to two or more data sets or subsets.

Such redundancy is used in certain RAID disc arrays such as RAID 5, for example.

Although the parity schemes used in RAID arrays may be sufficient to provide the necessary redundancy in a controlled environment using monitored disc drives within a single cabinet or data centre, the level of redundancy may not be suitable for more distributed or ad-hoc storage mechanisms, which may incorporate storage devices or disc drives remote from each other or separated across a network. Furthermore, many RAID systems are limited being able to respond and recover from single points of failure such as a single disk failing. Multiple simultaneous failures in RAID arrays may not be recoverable.

Therefore, there is required a method and system that overcomes these problems.

SUMMARY OF THE INVENTION

Against this background and in accordance with a first aspect there is provided a method of protecting data comprising the steps of: dividing data into a plurality of data subsets; generating parity data for each data subset and another data subset of the plurality of data subsets; and generating parity data for each data subset and a second other data subset of the plurality of data subsets. This method processes data to secure it or protect it from loss or corruption. Any missing data subsets may be recoverable from the generated parity data and remaining data subsets. This method may also provide more resilience to multiple simultaneous failures, for example when more than one disk drive fails at the same time or when multiple remote storage locations become unavailable or inaccessible.

Optionally, the method may further comprise the step of storing the plurality of data subsets and the generated parity data. These may be stored in disk drives, flash drives, computers, servers or other data stores or a mixture of these. The storage locations may be remote from each other or local and may be accessible over a network such as the Internet, for example.

Optionally, the method may further comprise the step of transmitting the plurality of data subsets and the generated parity data. Transmission may be by means of wireless or wired transmission including but not limited to Ethernet and mobile telecommunications.

Preferably, at least two sets of parity data are generated for every data subset. More than two parity data sets may also be generated.

Optionally, each data subset may have parity data generated for its two neighbouring data subsets. For data divided into sequences the neighbours may be sequential.

Optionally, parity data may be generated for the first data subset with last data subset. In other words, the combinations are arranged cyclically.

Preferably, the parity data may be generated using the exclusive OR, XOR, logical operator. Other logical operators may be used.

Optionally, the data may be divided into an odd number of data subsets. An even number may also be used.

Preferably, the data may be divided into a predetermined number of data subsets.

According to a second aspect there is provided a method of recovering data comprising the steps of: retrieving a data subset; retrieving parity data generated as described above; regenerating any missing data subsets using the retrieved data subset and retrieved parity data; and combining the retrieved data subset and regenerated missing data to form the recovered data.

According to a third aspect there is provided a method of recovering data comprising the steps of: retrieving one or more data subsets; retrieving two or more different parity data sets generated for one data subset; regenerating any missing data subsets using the retrieved one or more data subset and two or more retrieved parity data sets; and combining the one or more retrieved data subset and regenerated missing data subsets to form the recovered data. The data subsets and/or parity data sets may be recovered from storage mechanisms or locations or received as signals, for example.

According to a fourth aspect there is provided apparatus for generating parity data comprising: a processor configured to: divide data into a plurality of data subsets, generate parity data for each data subset and another data subset of the plurality of data subsets, and generate parity data for each data subset and a second other data subset of the plurality of data subsets.

Optionally, the apparatus may be selected from the group consisting of: a computer, mobile computer, cell phone, handset, server, transmitter, disk and drive controller. Other apparatus or processors may be used.

The method described above may be implemented as a computer program comprising program instructions to operate a computer. The computer program may be stored on a computer-readable medium.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale.

DETAILED DESCRIPTION OF THE PREFERRED EMBODIMENTS

Parity data may be generated using the exclusive OR function (XOR). For example:

$$(A)0100 \char`\^ (B)0010=(P)0110 \qquad \text{equation 1}$$

where $\char`\^$ is the XOR function.

Should either data set A or B be lost, then the missing data may be reconstructed from the remaining data and the parity data (P) using the same XOR function, for example:

$$(A)0100 \char`\^ (P)0110=(B)0010 \qquad \text{equation 2}$$

In order to generate redundant data to protect a particular data file or data set, then this original data (F) may be divided into equal blocks or subsets. This may be represented as:

$$F\{1,2,3,\ldots n\} \qquad \text{equation 3}$$

Parity data may be generated as:

$$1\char`\^2, 3\char`\^4, \ldots (n-1)\char`\^n \qquad \text{equation 4}$$

Figure 1:
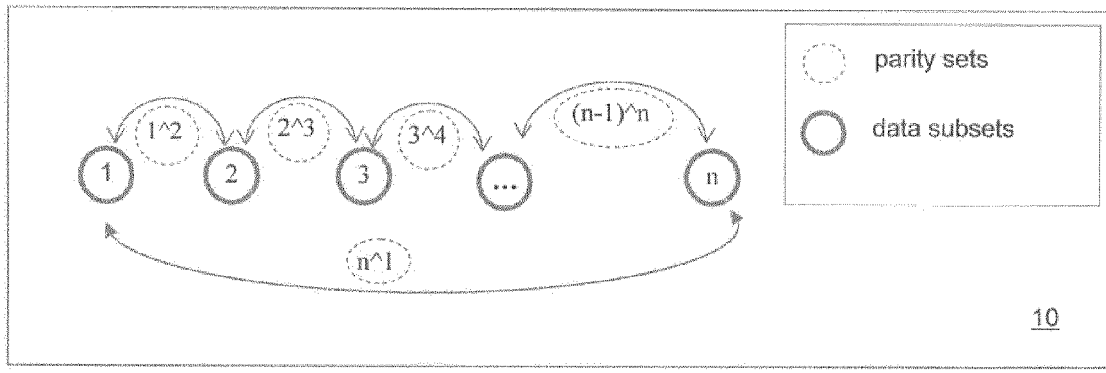
FIG. 1 shows a schematic diagram indicating a method for generating parity data, given by way of example only.

FIG. 1 shows a method 10 for generating more robust sets of parity data. This method 10 allows for a greater number of data subset (and/or parity data) losses before the data becomes unrecoverable. The solid numbered circles 1, 2, 3, . . . n, represent data subsets formed by dividing the original data. Two sets of parity data are generated for each data subset. Each data subset is paired with another data subset and parity data is generated. The data subset is then paired with a different data subset and a further set of parity data is generated. In other words, each data subset is associated with two different other data subsets with parity data generated for each pairing. For example, in FIG. 1 this is shown as each data subset being paired with both of its neighbours (e.g. 2 paired with 1 and 2 also paired with 3). The first (1) and last (n) data subsets only have one neighbour (2 and n−1 respectively). Therefore, the first data subset is paired with the last data subset so that more than one set of parity data may be associated with the end data sets. However, any other combination and permutation may be used so that each data subset has at least two parity data sets associated with it. In notation form, this may be described as:

$$C_1\{1\char`\^2, 3\char`\^4, \ldots (n-1)\char`\^n\}$$

$$C_2\{2\char`\^3, 3\char`\^4, \ldots n\char`\^1\} \qquad \text{equation 5}$$

Figure 2:
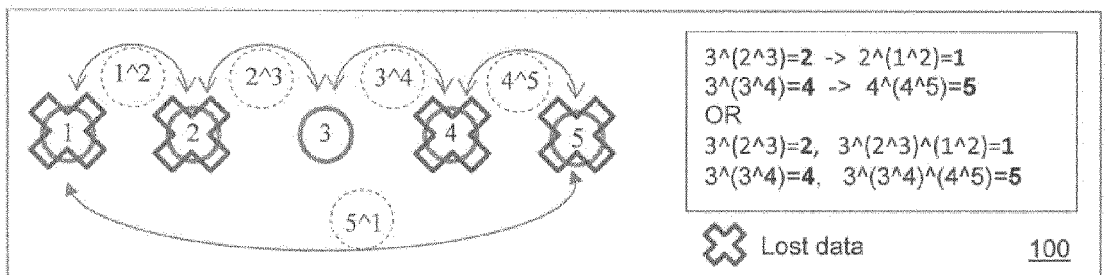
FIG. 2 shows a schematic diagram of an illustrative method for reconstructing missing data using parity data generated in accordance with the method shown in FIG. 1.

In an example where the original data is divided into five data subsets, the loss of four data subsets may still enable reconstruction of all of the original data provided that all of the parity data sets are retrievable. Such a situation is shown in FIG. 2, which schematically shows an example method 100 for reconstructing or regenerating missing data subsets.

In this example, the third data subset is available as well as the five parity data sets (1^2, 2^3, 3^4, 4^5 and 5^1). The box in FIG. 2 shows two alternative ways in which each of the missing data subsets 1, 2, 4 and 5 may be reconstructed using the XOR function.

Figure 3:
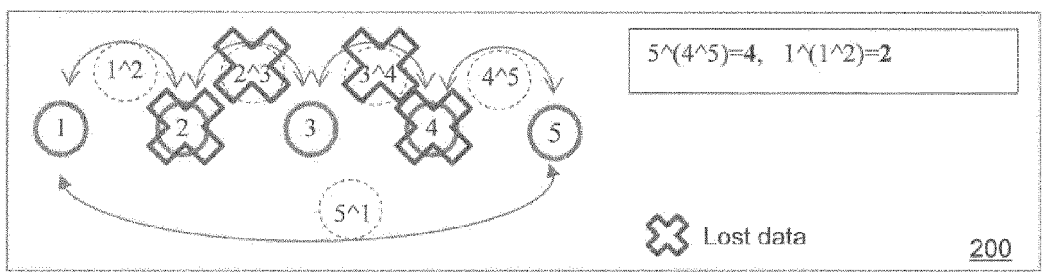
FIG. 3 shows a schematic diagram of a further illustrative method for reconstructing missing data using the parity data generated using the method of FIG. 1.

FIG. 3 shows a further example situation in which, five data subsets and created from original data but where two of the data subsets and two of the parity data sets (2^3 and 3^4) are lost or missing. In this particular reconstruction method 200, the two missing data subsets 2 and 4 are recovered using the XOR operations shown in the side box.

In general terms, the loss of data subsets in any combination up to (n−1) may still result in all of the data being recoverable.

It is noted that the particular examples shown in FIGS. 2 and 3 are two of many alternative combinations and schemes for recovering data. Furthermore, it is noted that the cyclic approach shown in FIG. 1 for generating two parity data sets for each data subset is one of many alternatives. For example, each data subset may be paired with non-neighbouring subsets to form parity data.

When dividing the data into data subsets, a predetermined number of data subsets may be chosen. This may relate to the number of available or required storage locations (for each data subset and each parity data set) that are to be used, or separate data channels or other means of transmitting the data subsets from one location to another.

Figure 4:
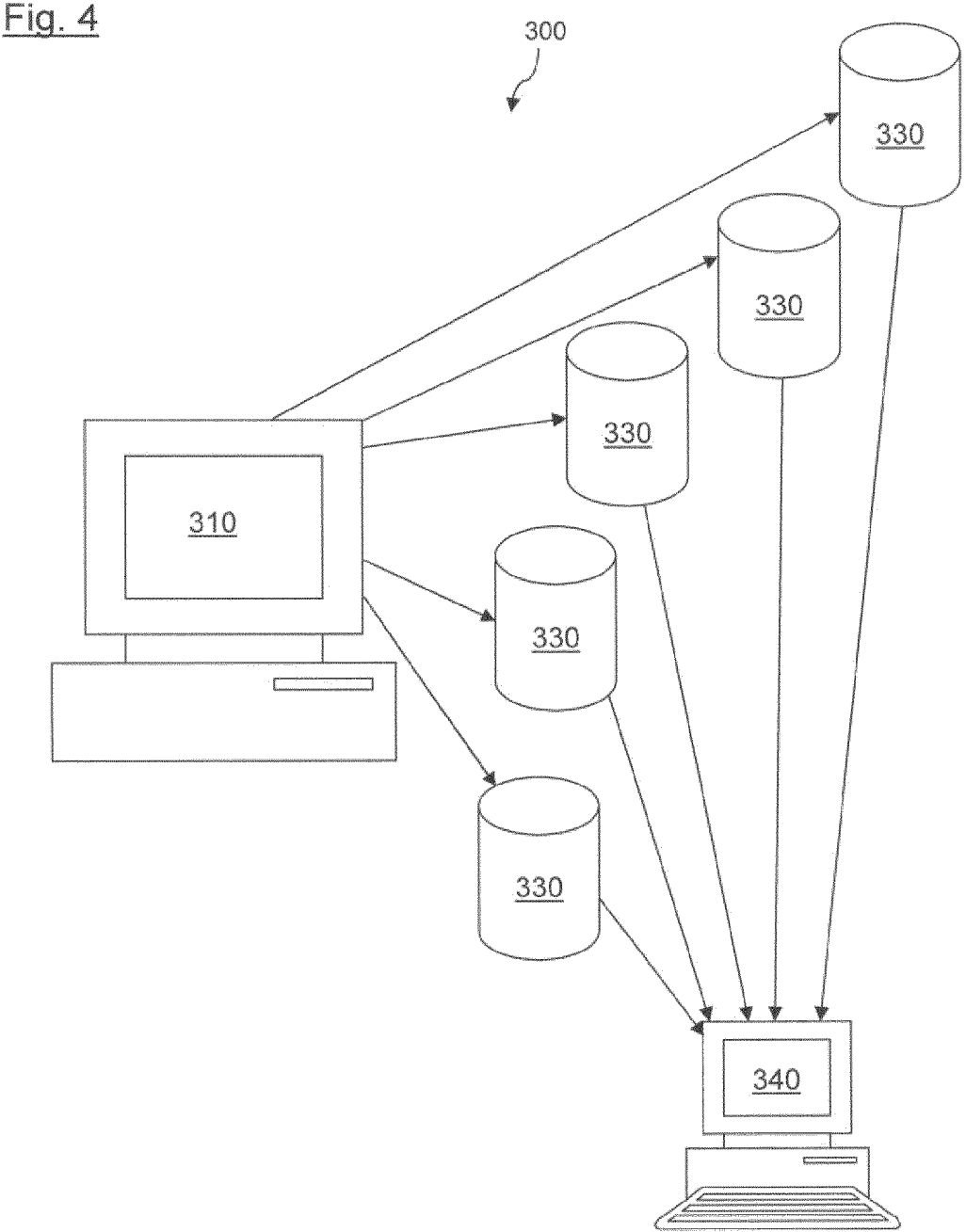
FIG. 4 shows a system for generating parity data according to the method shown in FIG. 1.

FIG. 4 shows a system 300 for implementing the methods described with reference to FIGS. 1 to 3. This is an example system and others may be contemplated by the skilled person. In this particular example, a server 310 may be used to divide the data into data subsets and generate the parity data. These data subsets and parity data may then be stored in separate storage locations 330, which may distributed or remote from each other across a network or located together in a storage cabinet, for example. A separate computer or processor 340 may retrieve the data from the storage locations 330 (e.g. disc drives). The computer 340 may regenerate or reconstruct any missing data in accordance with the example schemes shown with regards to FIG. 2 or 3.

A benefit of generating more than one set of parity data for each data subset is the increase redundancy allowing for a greater proportion of data loss than by relying on a single parity data set associated with each data subset.

As well as disc arrays, distributed storage systems and cloud storage systems (for example), the described method and system for generating parity data may be used in many other situations where data reliability and security is necessary or required. For example, this scheme of parity generation may be used in receiving and transmitting data across a wired network, wireless network or mobile network, or for storing data in physical media such as optical discs, for example.

As will be appreciated by the skilled person, details of the above embodiment may be varied without departing from the scope of the present invention, as defined by the appended claims.

For example, other logical functions may be used in place of the XOR function to derive parity data.

The number of separate or different parity data sets created for each data subset is not limited to two but may be greater. For example, each data subset may be paired with up to every other data subset creating:

$$\frac{n!}{k!(n-k)!} \qquad \text{equation 6}$$

parity data sets, where n is the number of data subsets and k is the number of data subsets compared to create parity data (k≤n). In an example, four data subsets may be created (n=4) from pairs (k=2) of data subsets so that six different parity data set may be formed that could populate six separate storage locations.

In order to divide the original data into larger numbers of data subsets (e.g. every 512 bytes) without requiring very large numbers of separate storage locations, each storage location may store many separate data subsets and/or parity data sets. So long as the storage scheme is known reconstruction may be successfully achieved.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method of protecting data comprising the steps of:
   a) dividing, by a first processor, data into a plurality of data subsets;
   b) generating, by the first processor, parity data for each data subset and another data subset of the plurality of data subsets;
   c) generating, by the first processor, parity data for each data subset and a second other data subset of the plurality of data subsets;
   d) storing, by the first processor, the plurality of data subsets and the generated parity data in a distributed storage system comprising storage locations distributed remotely from each other;
   e) retrieving, by a second processor unassociated with the first processor, one or more data subsets;
   f) retrieving, by the second processor, two or more different parity data generated for each of one or more unretrieved data subsets;
   g) regenerating, by the second processor, the one or more unretrieved data subsets using the retrieved one or more data subsets and the retrieved parity data; and
   h) combining, by the second processor, the one or more retrieved data subsets and the one or more regenerated data subsets to form the data,
   wherein the storage locations are accessible by the first and second processor over the Internet, and further wherein the storage locations comprise a mixture of disk drives, flash drives, computers, servers or other data stores.

2. The method according to claim 1, wherein the each data subset has parity data generated with its two neighbouring data subsets.

3. The method according to claim 1, wherein generating parity data for each data subset and another data subset of the plurality of data subsets comprises generating parity data for a first data subset in the plurality of data subsets with a last data subset in the plurality of data subsets.

4. The method according to claim 1, wherein each parity data is generated using the exclusive OR (XOR) logical operator.

5. The method according to claim 1, wherein the data is divided into an odd number of data subsets.

6. The method according to claim 1, wherein the data is divided into a predetermined number of data subsets.

7. A system for protecting data comprising:
   a first processor configured to:
      divide data into a plurality of data subsets,
      generate parity data for each data subset and another data subset of the plurality of data subsets,
      generate parity data for each data subset and a second other data subset of the plurality of data subsets,
      access over the Internet storage locations distributed remotely from each other, wherein the storage locations comprise a mixture of disk drives, flash drives, computers, servers or other data stores, and
      store the plurality of data subsets and the generated parity data in the storage locations; and
   a second processor configured to:
      access the storage locations over the Internet and retrieve one or more data subsets and retrieve two or more different parity data sets generated for each of one or more unretrieved data subsets,
      regenerate the one or more unretrieved data subsets using the retrieved one or more data subsets and the retrieved parity data, and
      combine the one or more retrieved data subsets and the one or more regenerated data subsets to form the data,
      wherein the first processor and the second processor are unassociated.

8. The system of claim 7, wherein each of the first processor and the second processor is provided within one of: a computer, mobile computer, cell phone, handset, server, transmitter, disk or drive controller.

9. The system according to claim 7, wherein the each data subset has parity data generated with its two neighbouring data subsets.

10. The system according to claim 7, wherein generating parity data for each data subset and another data subset of the plurality of data subsets comprises generating parity data for a first data subset in the plurality of data subsets with a last data subset in the plurality of data subsets.

11. The system according to claim 7, wherein each parity data is generated using the exclusive OR (XOR) logical operator.

12. The system according to claim 7, wherein the data is divided into an odd number of data subsets.

13. The system according to claim 7, wherein the data is divided into a predetermined number of data subsets.

* * * * *